(12) United States Patent
Zhou et al.

(10) Patent No.: US 8,976,345 B2
(45) Date of Patent: Mar. 10, 2015

(54) FITTING TIP WITH RELAY LENS FOR FIBER-OPTIC CONNECTOR ENDFACE INSPECTOR

(71) Applicant: Lightel Technologies, Inc., Renton, WA (US)

(72) Inventors: Ge Zhou, Renton, WA (US); Shangyuan Huang, Kent, WA (US)

(73) Assignee: Lightel Technologies, Inc., Renton, WA (US)

( * ) Notice: Subject to any disclaimer, the term of this patent is extended or adjusted under 35 U.S.C. 154(b) by 171 days.

(21) Appl. No.: 13/910,064

(22) Filed: Jun. 4, 2013

(65) Prior Publication Data

US 2014/0354977 A1 Dec. 4, 2014

(51) Int. Cl.
*G01N 21/00* (2006.01)
*G01M 11/00* (2006.01)

(52) U.S. Cl.
CPC .................................... *G01M 11/30* (2013.01)
USPC ........................................................ 356/73.1

(58) Field of Classification Search
CPC .......... G01M 11/3145; G01M 11/335; G01M 11/33; G01M 11/3109; G01M 11/338

USPC ........................................................ 356/73.1
See application file for complete search history.

(56) References Cited

U.S. PATENT DOCUMENTS 6,466,366 B1 * 10/2002 Dominique .................... 359/379
7,356,236 B1 * 4/2008 Huang et al. .................. 385/134

* cited by examiner

*Primary Examiner* — Tarifur Chowdhury
*Assistant Examiner* — Md Rahman
(74) *Attorney, Agent, or Firm* — Pai Patent & Trademark Law Firm; Chao-Chang David Pai (57) ABSTRACT

A fitting tip of fiber-optic connector endface inspection microscope for inspecting angled connector endfaces includes a relay lens fixed inside its internal channel and is designed such that when it is received in an intended connector adapter and mounted to the inspection microscope, the normal line to the connector endface forms an acute angle γ with the optical axis of the relay lens; the ray exiting from the relay lens and conjugate to the ray along the normal line is aligned with the optical axis of the inspection microscope; and as a result the connector endface is imaged on an imaging plane within the focusing adjustment range of the inspection microscope. The best image of the connector endface is obtained when the angle γ is half of the inclined angle of the angled connector endface.

15 Claims, 10 Drawing Sheets

$\alpha=4°, \gamma=8.0°, -\alpha=4°, \beta=\alpha-\gamma=0°$

FITTING TIP WITH RELAY LENS FOR FIBER-OPTIC CONNECTOR ENDFACE INSPECTOR

BACKGROUND OF THE INVENTION

1. Field of the Invention

The present invention generally relates to an apparatus for inspecting fiber-optic connectors. In particular, the present invention relates to a fitting tip of the hand-held fiber-optic inspection probe for properly aligning and imaging angled fiber-optic connector endfaces. The present invention further relates to inspection probes fitted with such a fitting tip.

2. Description of the Related Art

The widespread implementation of fiber-optic communications has created an urgent need for regularly inspecting and maintaining the large number of fiber-optic connectors, which are often situated behind backplanes or in locations which are very difficult to access.

It is well known in the fiber-optic communications industry that the endfaces of optical fibers within communication systems must be kept clean and undamaged, otherwise serious signal loss could result. The demand for cleanliness for fiber-optic endfaces has become even more stringent as the communication bandwidths increase and new communication technologies requiring higher laser power are applied.

Many types of inspection devices with microscopes are already available for inspecting endfaces of a fiber-optic connector to make sure the endfaces are undamaged and clean. When an inspection probe is used to view or image the endface of a fiber-optic connector embedded in a connector adapter, a fitting tip for the inspection probe is typically needed to provide a mechanical interface with the connector adapter. There are currently available on the market a large number of fiber-optic connectors and their corresponding connector adapters. Consequently, a large number of fitting tips are needed for different types of inspection probes and connector adapters.

Generally, the endface of a connector comes in two kinds of shapes or finishes: PC (physical contact) and APC (angled physical contact). The APC endface is inclined at a standard angle of 8°.

In order to clearly view or image a connector endface using an inspection probe, it is important to align the optical axis of the microscope optical system of the inspection probe so that it is perpendicular to the connector endface. In general, the alignment is facilitated by using a fitting tip to properly connect and align the inspection probe with the connector adapter at a certain angle.

For a PC connector, the fitting tip is only required to align the optical axis of the inspection probe align with the axis of the ferrule of the connector. However, for an APC connector, the fitting tip must also deflect the optical axis of the inspection probe by an angle of 8° relative to the axis of the connector ferrule. The deflection of the optical axis of the inspection probe can normally be achieved by the mechanical structure of the fitting tip.

Besides properly aligning the optical axis of the inspection probe with the connector endface, the fitting tip may also serve to ensure that the connector endface is positioned within the focusing adjustment range of the microscope objective of the inspection probe. This is because the focusing adjustment range of the microscope objective is usually very limited, e.g. just a few millimeters, and the connector endface is often relatively deep inside the connector adapter. The length of the fitting tip may be adapted to make sure that the connector endface is within the focusing adjustment range of the microscope objective of the inspection probe.

Figure 1:
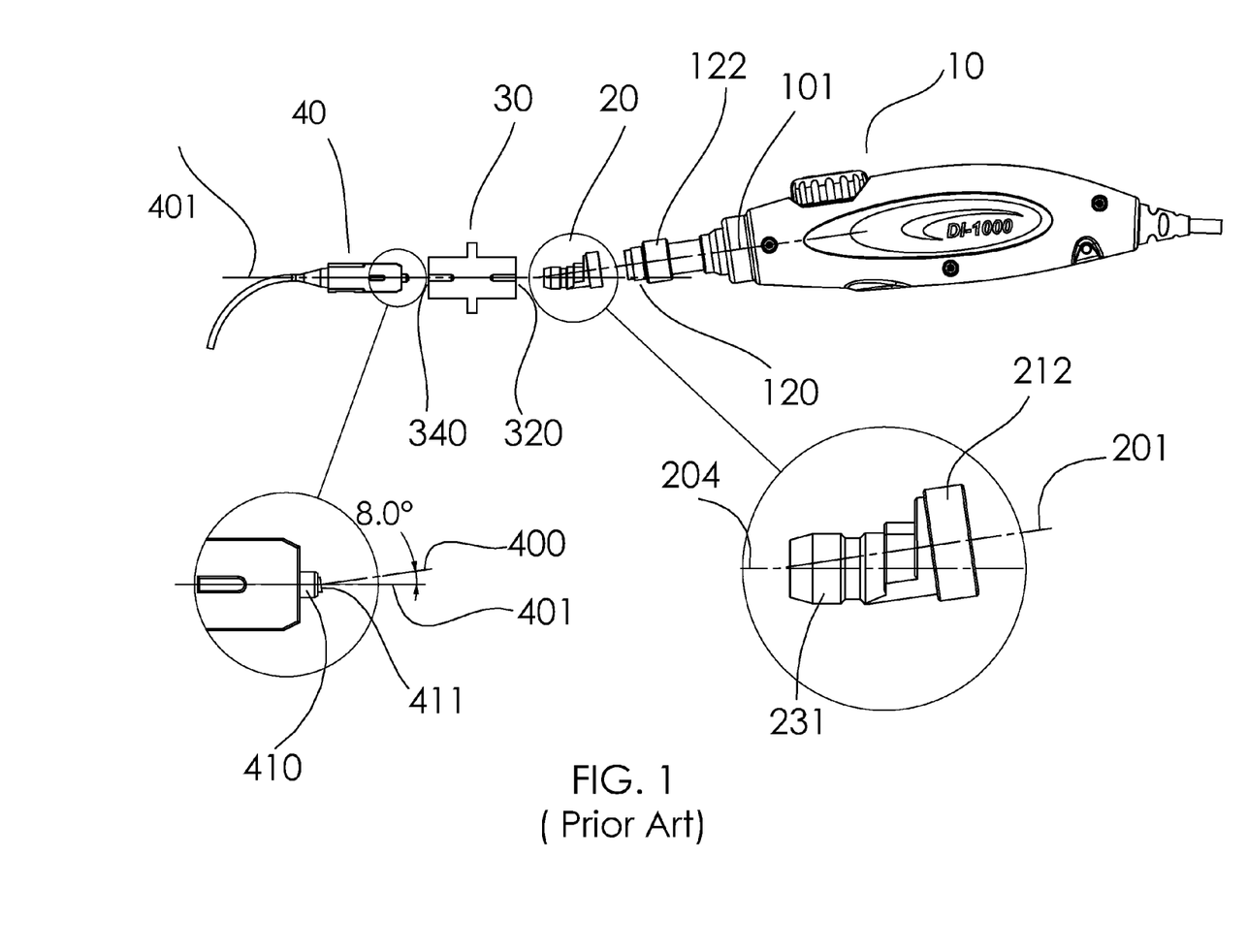
FIG. 1 shows the relationship of the various devices and elements, including a conventional fitting tip without a relay lens, for inspecting the angled fiber-optic connector endface.
Figure 2:
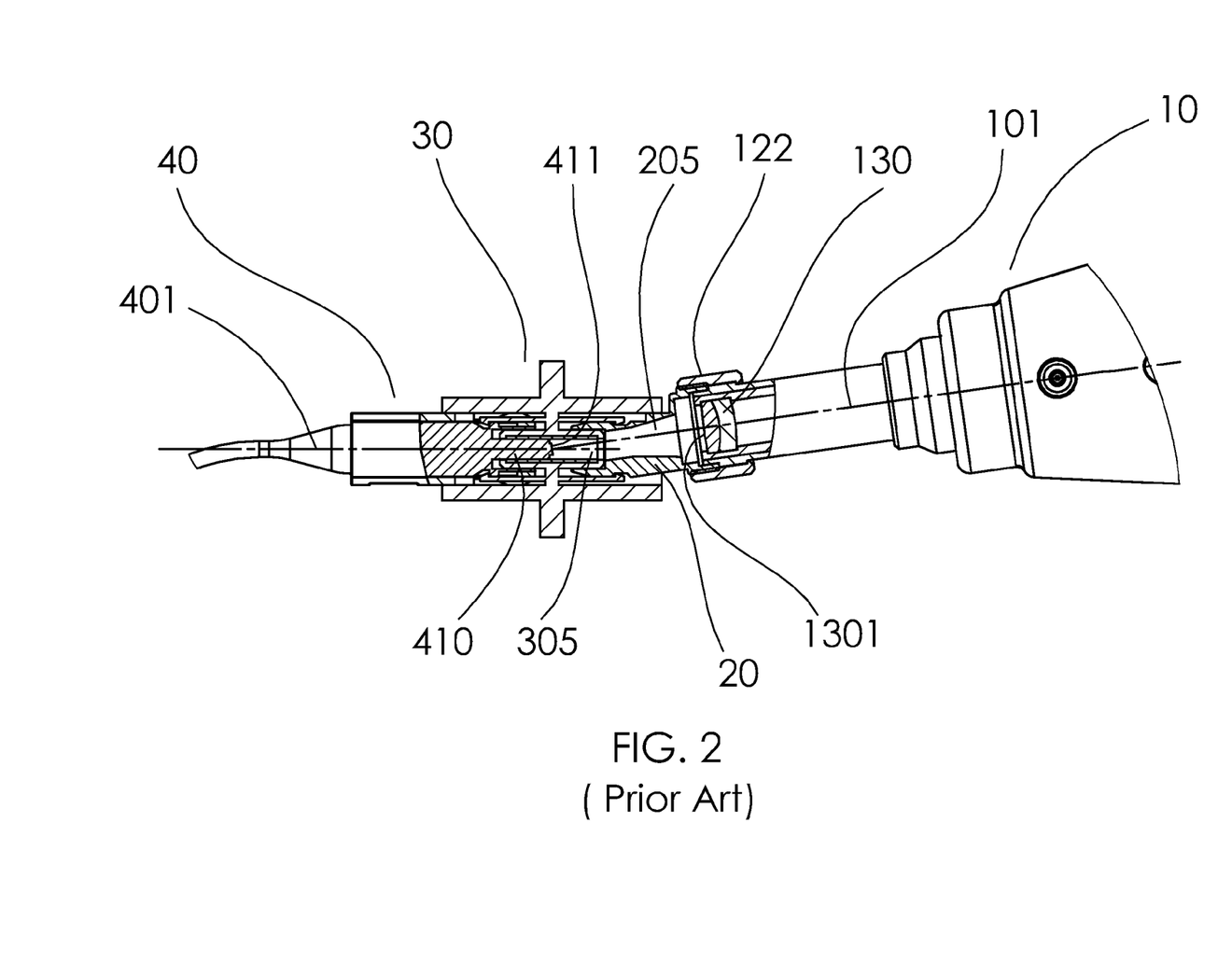
FIG. 2 illustrates how the various devices and elements in FIG. 1 are connected together for inspecting the angled fiber-optic connector endface.

FIG. 1 and FIG. 2 illustrate the inspection of a fiber-optic connector 40 (which is an SC/APC Connector with an endface inclined at 8°) by an inspection probe 10 fitted with a fitting tip 20 designed specifically for the SC/APC Connector. FIG. 1 shows the connector 40, the connector adapter 30, the fitting tip 20 and the inspection probe 10 separately before they are connected for an inspection job. As shown in the exploded view in FIG. 1 and the broken-out section view in FIG. 2, when the endface 411 of the connector 40 is to be inspected, the connector 40 is inserted into one end 340 of the connector adapter 30 and the front end tube 231 of the fitting tip 20 is inserted into the other end 320 of the connector adapter 30; the back end tube 212 of the fitting tip 20 is mounted on the front portion 120 of the inspection probe 10 and fixed thereto by matching the male thread on the back end tube 212 and the female threaded knob 122 with female thread on the front portion 120 of the inspection probe 10.

In this arrangement, because the connector endface 411 is inclined at 8°, the normal 400 to the connector endface 411 at the center thereof and the axis 401 of the connector ferrule 410 intersect at the center of the connector endface 411 and form an angle of 8°. When inspecting the connector endface 411, the optical axis 101 of the microscope optical system of the inspection probe should be aligned with the normal 400 to the connector endface 411 so that the connector endface 411 is perpendicular to the optical axis 101 to achieve the best image. To ensure the alignment of the optical axis 101 and the normal 400, the fitting tip 20 is constructed such that, when it is connected to the connector adapter 30 and the inspection probe 10, the axis 204 of the front end tube 231 is aligned with the axis 401 of the connector ferrule 410, and the axis 201 of the back end tube 212 is aligned with the optical axis 101 of the inspection probe 10. As a result, the angle between the axis 204 of the front end tube 231 and the axis 201 of the back end tube 212 will be essentially equal to the inclined angle of the connector endface 411, namely 8° in this case.

As shown in FIG. 2, the fitting tip 20 has a light passing channel 205, and the connector adapter 30 has a light passing channel 305. The optical axis 101 of the microscope optical system is arranged to perpendicularly align with the connector endface 411 of the connector 40 and intersect with the axis 401 of the connector ferrule 410. In this application, because the transverse space inside the connector adapter 30 is broad enough to accommodate a fairly broad channel 205 of the fitting tip 20, the light from the connector endface 411 will not be unduly obstructed between the connector endface 411 and the first surface 1301 of the microscope objective 130 of the inspection probe 10. Consequently, as long as the working distance of the microscope objective 130 is long enough, the microscope optical system of the inspection probe 10 can be directly focused on the connector endface 411 for inspection to obtain a clear image.

This type of fitting tip as illustrated in FIG. 1 and FIG. 2 can be applied to many types of connectors, such as SC, FC Connectors with a standard 8° inclined endface.

However, for some types of connector adapters with a relatively deeper channel, the distance between the endface 411 and the first surface 1301 of the microscope objective 130 of the inspection probe 10 will exceed the working distance of the microscope objective 130, and therefore the microscope optical system of the inspection probe 10 cannot be directly focused on the connector endface 411. For such connectors, a relay lens can be disposed inside the fitting tip. The function of the relay lens is to form an intermediate image of the connector endface within the working distance of the microscope objective 130 so that the inspection probe 10 may focus on the intermediate image to obtain a clear image. Thus, the relay lens effectively extends the working distance of the microscope objective and allows the fitting tip to be lengthened to reach the connectors hidden deep inside the connector backplane, where the inspection probe is unable to reach.

Figure 3A:
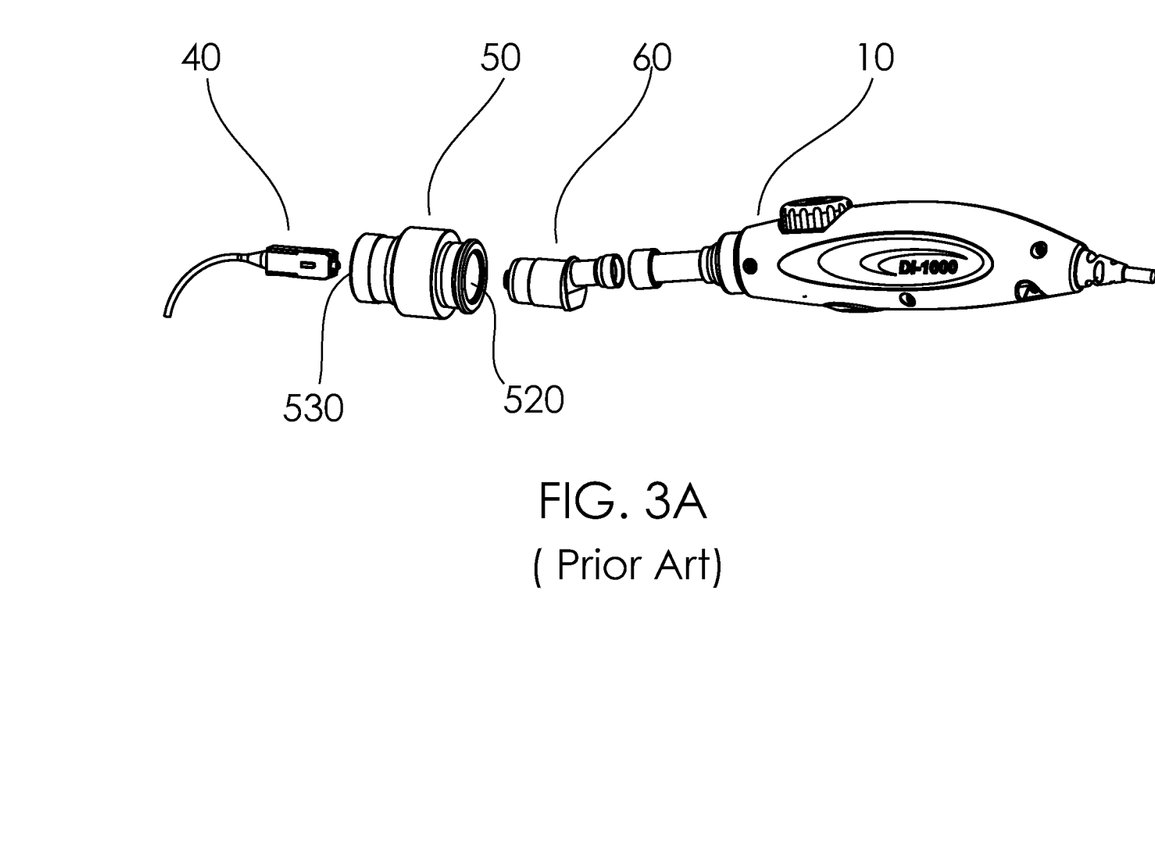
FIG. 3A shows the relationship of the various devices and elements, including a conventional fitting tip with a relay lens, for inspecting the angled fiber-optic connector endface.
Figure 3B:
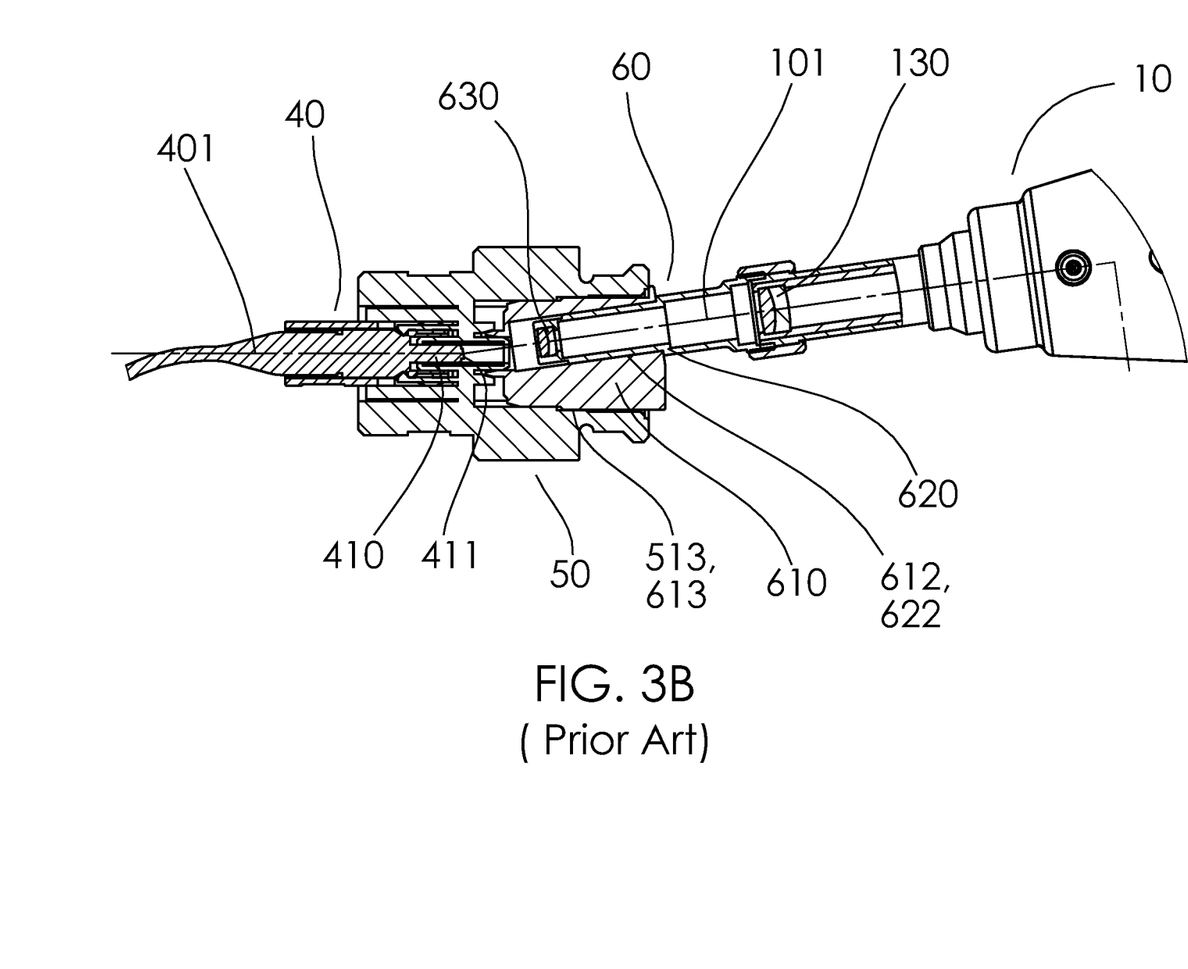
FIG. 3B illustrates how the various devices and elements in FIG. 3A are connected together for inspecting the angled fiber-optic connector endface.

As an example, FIG. 3A and FIG. 3B illustrate the application of a fitting tip 60 with a relay lens (or relay lens system) 630 to connector endface inspection, in which the connector adapter 50 is an OptiTap® Adapter. FIG. 3A shows the position of the fitting tip 60 relative to the inspection probe 10, the connector adapter 50 and the connector 40. When they are connected to inspect the connector 40 inserted into one end 530 of the connector adapter 50, the back end of the fitting tip 60 is mounted to the front portion of the inspection probe 10 and the front end of the fitting tip 60 is inserted into the other end 520 of the connector adapter 50.

The fitting tip 60 has a fitting tube 610 to fit inside the end 520 of the connector adapter 50 and a supporting tube 620 for mounting the relay lens 630. The inside surface 513 of the connector adapter 50 fits closely with the outside surface 613 of the fitting tip 60 so that the fitting tip 60 is stably fixed to the connector adapter 50. The fitting tip 60 further has a mechanical hole 612 inside the fitting tube 610 for mounting the supporting tube 620 in the fitting tube 610. The outside surface 622 of the supporting tube 620 fits closely inside the mechanical hole 612. The optical axis 101 of the microscope optical system of the inspection probe 10, the inclined connector endface 411, and the axis 401 of the connector ferrule 410 are also shown in FIG. 3B.

Figure 4:
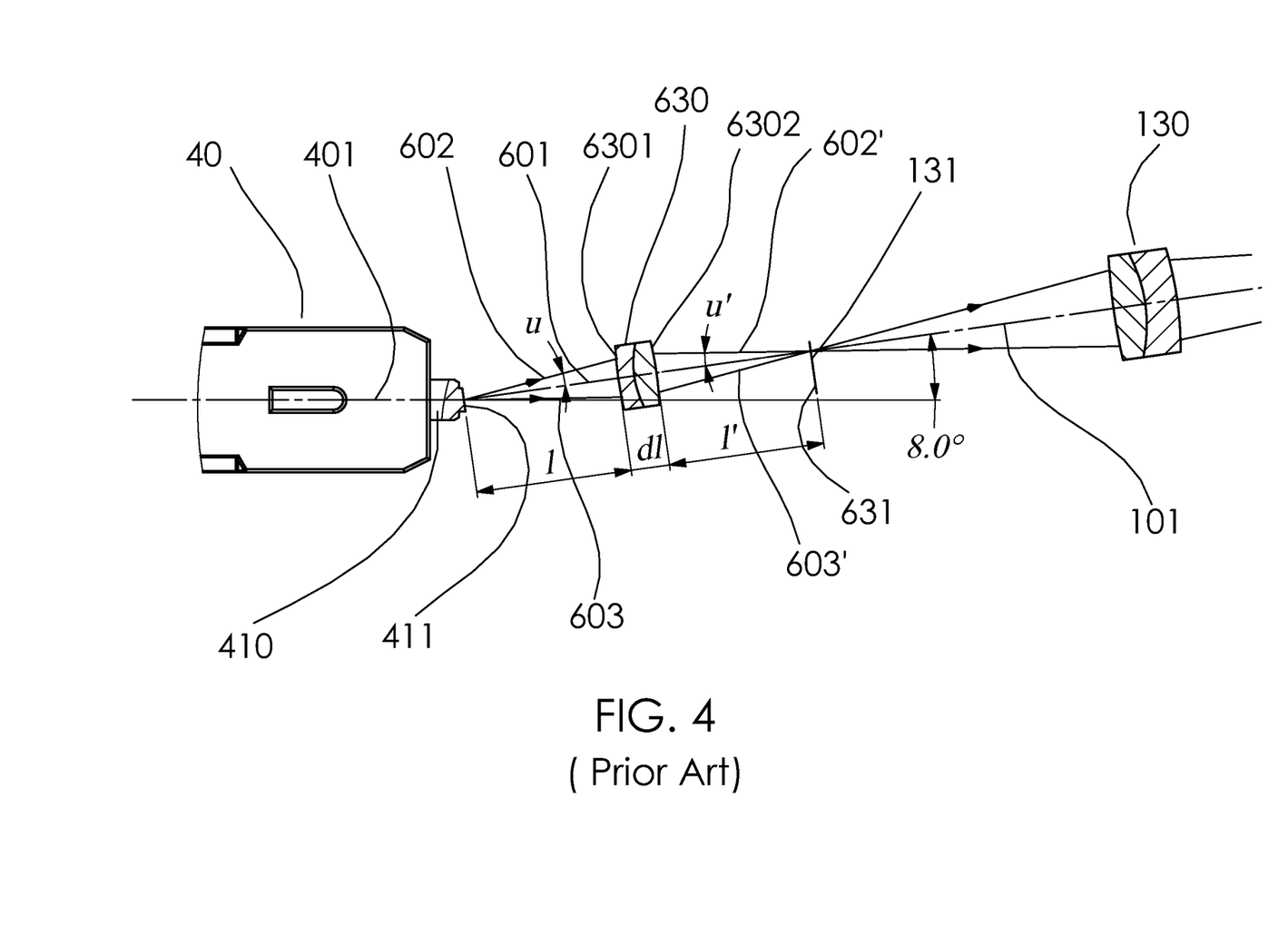
FIG. 4 illustrates the imaging geometry when the conventional fitting tip with a relay lens in FIG. 3B is used in inspecting the angled fiber-optic connector endface.

FIG. 4 shows the imaging geometry of the fitting tip 60 with the relay lens (or relay lens system) 630 shown in FIG. 3A&B. In this application, the fitting tip 60 (and therefore the relay lens 630) is positioned such that the optical axis 601 of the relay lens 630 is perpendicular to the connector endface 411 at the center therefore. Because the connector endface 411 has an inclined angle of 8°, the angle between the optical axis 601 of the relay lens 630 and the axis 401 of the connector ferrule 410 is also 8°.

FIG. 4 also shows that the optical axis 101 of the microscope optical system of the inspection probe 10 is aligned with the optical axis 601 of the relay lens 630. The image plane 631 of the relay lens 630 corresponds to the object plane 131 of the microscope objective 130 (at a point within the fitting tip 60). That is, the microscope objective 130 is focused on the image of the connector endface 411 on the image plane 631.

As shown in FIG. 4, two representative rays 602 and 603 in object space emitting from the center of the connector endface 411 enter the relay lens 630 and exit from the relay lens 630 as conjugate rays 602' and 603' in the image space, respectively. The image rays 602' and 603' converge on a point on the image plane 631 of the relay lens 630. As a result, the distance extended due to the relay lens 630 is:

$$L = l + l' + dl$$

wherein l is the distance between the connector endface 411 and the front surface 6301 of the relay lens 630, l' is the distance between the back surface 6302 of the relay lens 630 and the image plane 631, and dl is the distance between the front surface 6301 and the back surface 6302 of the relay lens 630. When the magnification of the relay lens 630 is −1×, l is equal to l' and the converging angle u' of the image ray 602' relative to the optical axis 601 of the relay lens 630 is equal to the emitting angle u of the ray 602.

Figure 5A:
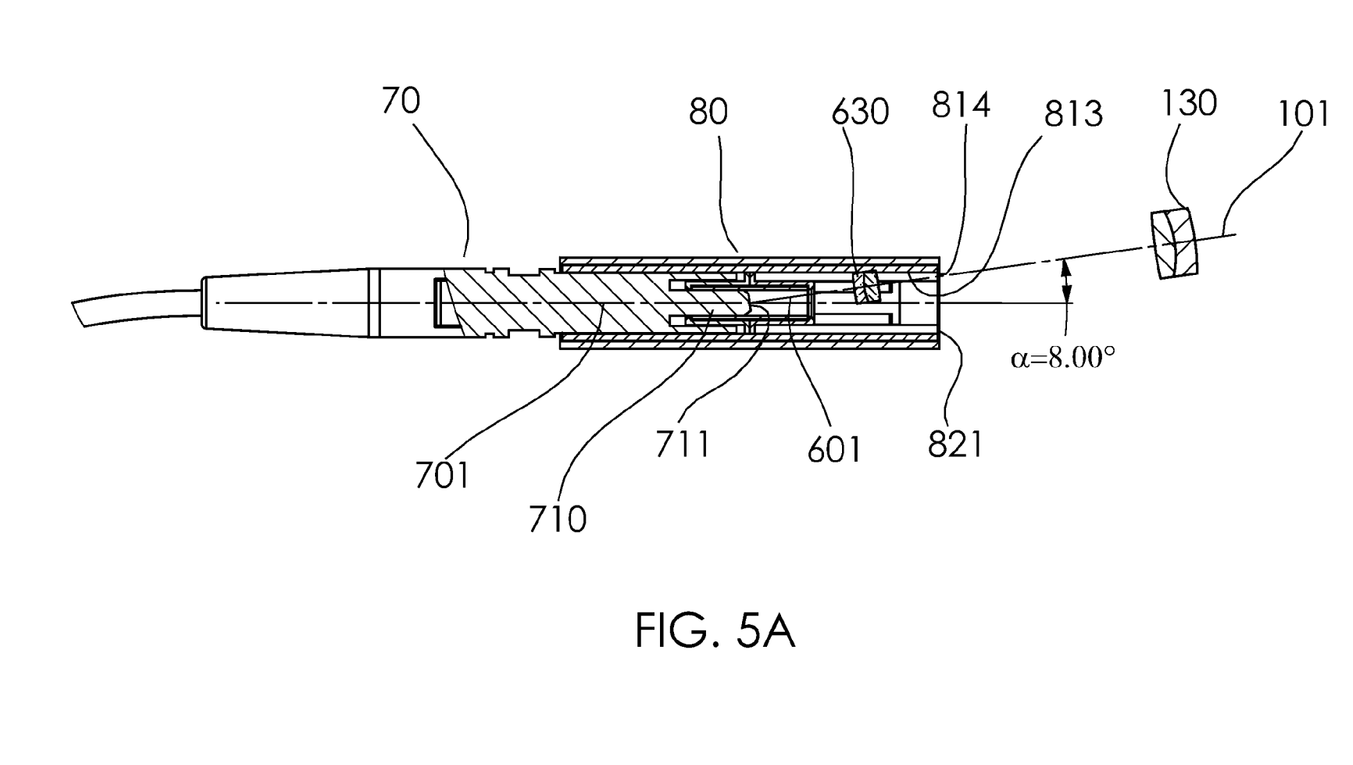
FIG. 5A illustrates the drawbacks and obstacles in using a conventional fitting tip with a relay lens in inspecting the angled fiber-optic connector endface which is located deep in a long narrow channel of a connector adapter.
Figure 5B:
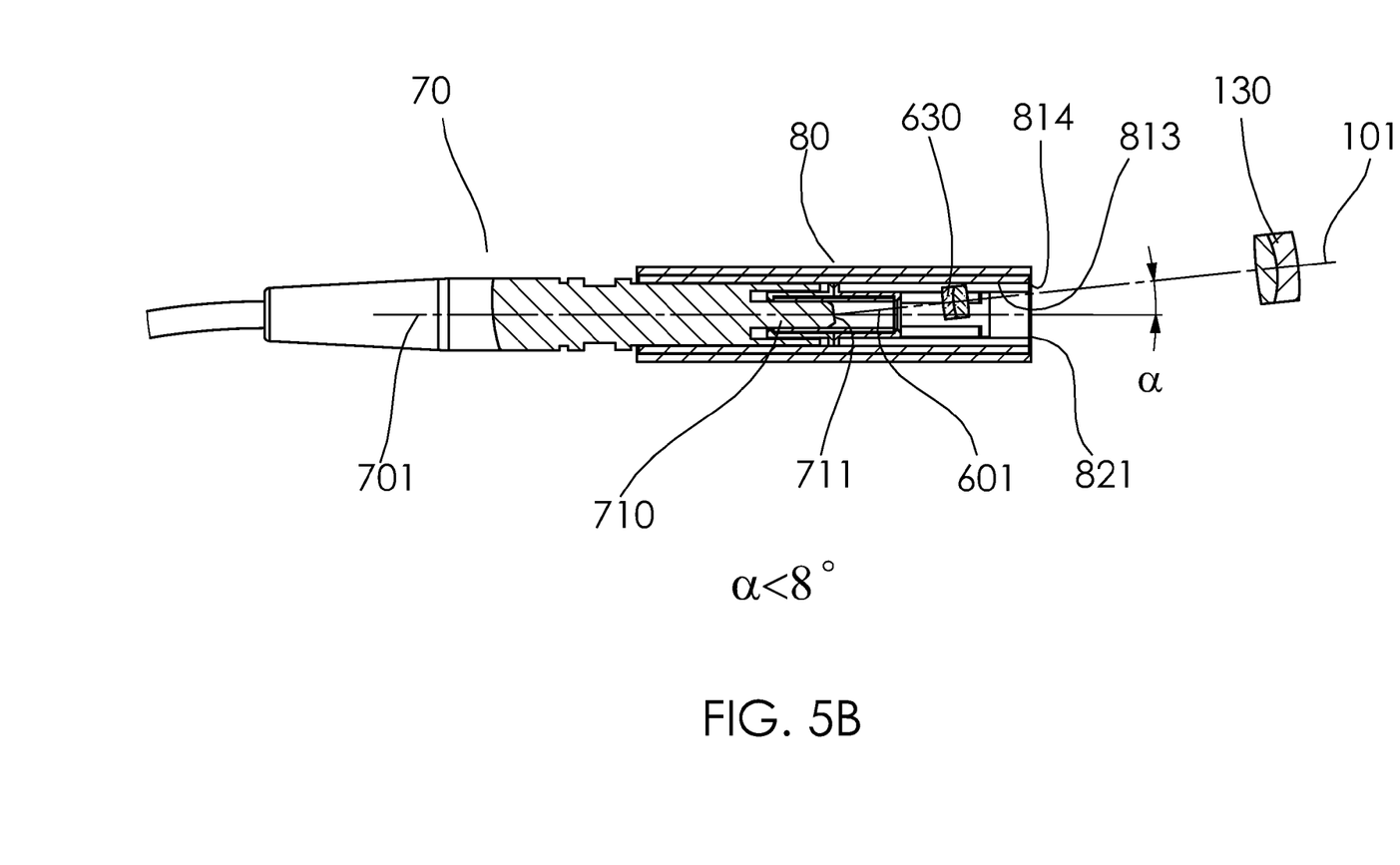
FIG. 5B illustrates the drawbacks and obstacles in adapting a conventional fitting tip with a relay lens in inspecting the angled fiber-optic connector endface when the optical axis of inspection microscope cannot be perpendicularly aligned with the connector endface which is located deep in a long narrow channel of a connector adapter.

However, the optics arrangement shown in FIG. 4 cannot be exactly applied to many other types of connectors, for example, E2000/APC, LC/APC, MU/APC, etc. This is because the connector adapters for these connectors have a relatively lengthy and narrow channel. As explained next, under this situation the fitting tip will encounter problems if the optical axis 601 of the relay lens 630 is kept perpendicular to the connector endface 411. As an example, FIG. 5A and FIG. 5B illustrate the application of a fitting tip with above relay lens arrangement to the E2000/APC Connector 70 (with an endface inclined at 8°) and the E2000 Connector Adapter 80. FIG. 5A shows that if the optical axis 601 of the relay lens system 630 of the fitting tip is arranged to be perpendicular to the connector endface 711 of the connector 70 and aligned with the optical axis 101 of the microscope optical system of the inspection probe, namely, if the angle α between the axis 701 of the connector ferrule 710 and the optical axis 601 of the relay lens system 630 is kept at 8°, the relay lens 630 will come in close contact with the inner wall 813 of the connector adapter 80. Otherwise, the diameter of the relay lens 630 will be fairly limited due to the space restriction, resulting in a limited optical aperture and thus a limited image resolution. It can also be seen that, with α=8°, the optical axis 101 of the microscope optical system is already very close to the edge 814 of the inner wall 813 of the connector adapter 80. So in essence half of the light emitting from the connector endface 711 will be blocked by the inner wall 813 of the connector adapter 80. As a result, the image viewed by the inspection probe will not be uniform in brightness and about half of the endface image will be dimmer than the other half.

In order to reduce the blocked amount of the light from the connector endface 711, a compromise solution is to reduce the angle α between the axis 701 of the connector ferrule 710 and the optical axis 601 of the relay lens system 630 (which is to be aligned with the optical axis 101 of the microscope optical system), as shown in FIG. 5B, α<8°. As a result, the optical axis 601 of the relay lens system 630 (and the optical axis 101 of the microscope optical system) will not be perpendicular to the connector endface 711 anymore, and thus the endface image as viewed by the microscope optical system will not be uniform in brightness and not synchronic in optimal focusing.

BRIEF SUMMARY OF THE INVENTION

The objective of the present application is to provide a fitting tip for aligning and imaging an angled fiber-optic connector endface in order to obtain an endface image without the aforementioned drawbacks of the conventional fitting tips.

The fitting tip of fiber-optic connector endface inspection microscope according to the present application includes a relay lens fixed inside its internal channel and is designed such that when the fitting tip is received in an intended connector adapter and mounted to the inspection microscope, the normal line to the connector endface forms an acute angle γ with the optical axis of the relay lens; the ray exiting from the relay lens and conjugate to the ray along the normal line is aligned with the optical axis of the inspection microscope; and as a result the connector endface is imaged on an imaging plane within the focusing adjustment range of the inspection microscope.

Using the fitting tip of the present application, the best image of the connector endface is obtained. The mechanical body of the fitting tip has the simplest structure for machining when the angle γ is half of the inclined angle of the angled connector endface and consequently the optical axis of the inspection microscope is parallel to the axis of the connector ferrule.

DETAILED DESCRIPTION OF THE INVENTION

Figure 6:
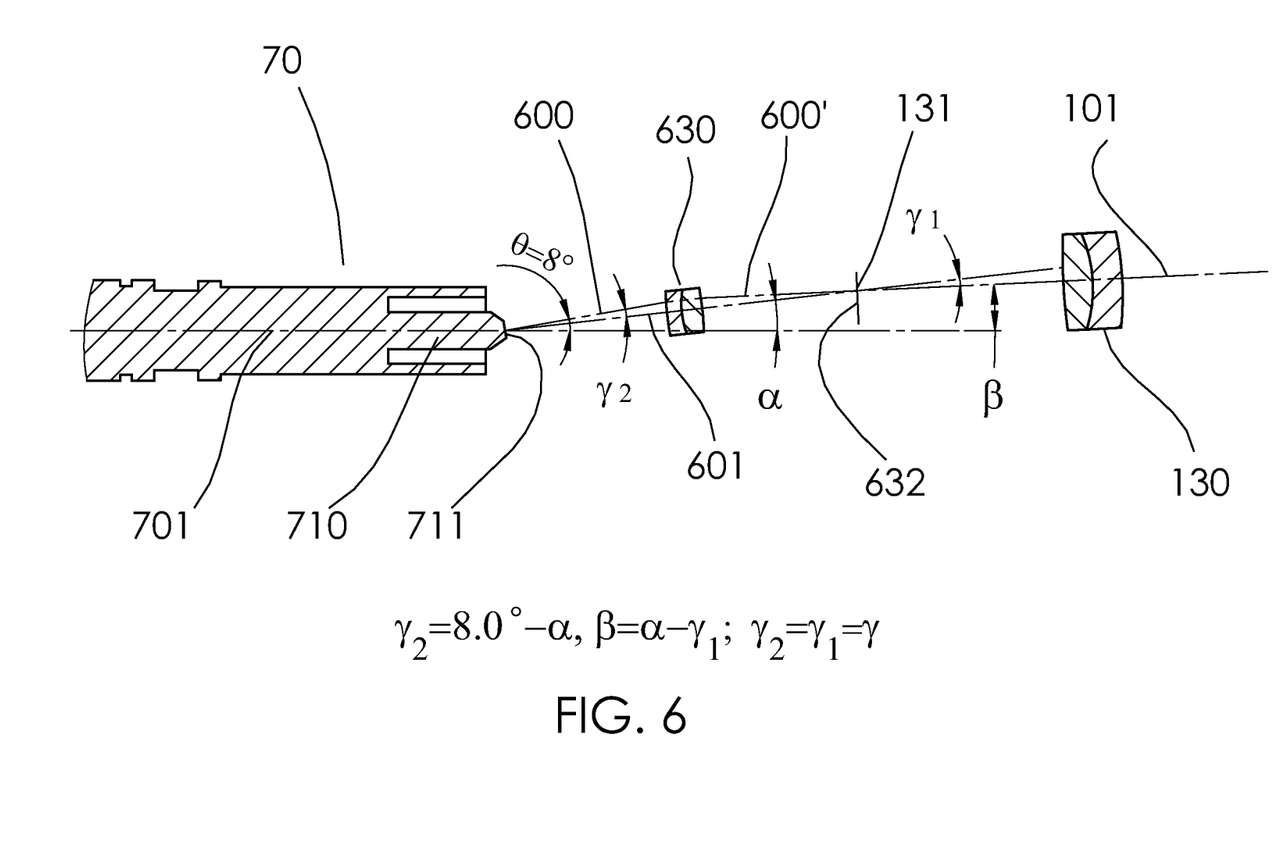
FIG. 6 illustrates the relay lens of the fitting tip according to the present application and its arrangement in relation to the inspection microscope and the connector endface.
Figure 8:
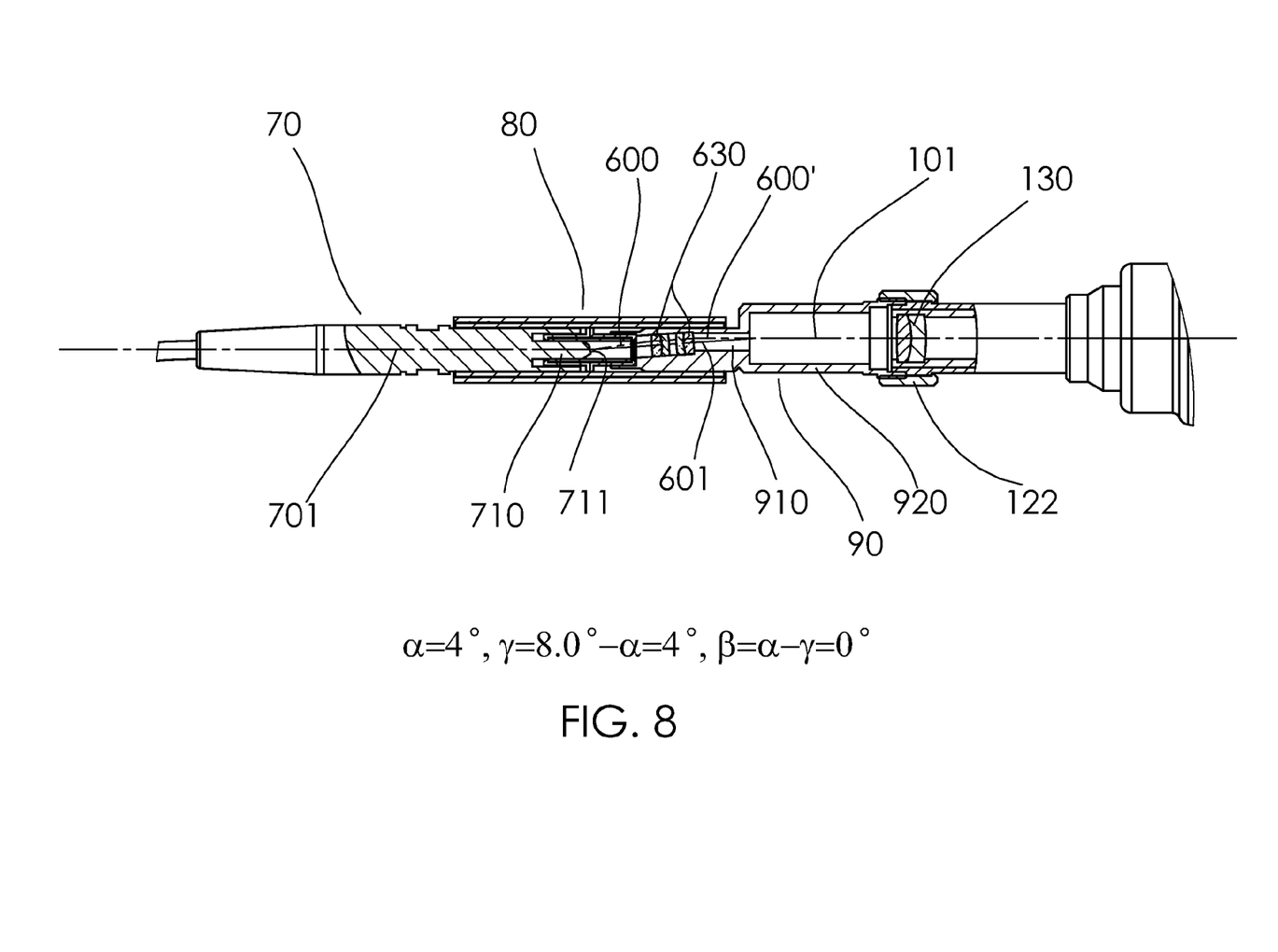
FIG. 8 illustrates a special case of the fitting tip according to the present application, wherein the optical axis of the inspection microscope is parallel to the axis of the connector ferrule, thus allowing the mechanical body of the fitting tip to have the simplest structure for machining.

The fitting tip according to the present application and the inspection probe using the fitting tip will be described in the following. FIG. 6 illustrates the design and imaging geometry of the fitting tip of the fiber-optic connector inspection probe according to the present invention. FIG. 8 shows the fitting tip 90 of the present invention inserted into one end of the connector adapter 80 opposite to the angled connector endface 711 of a fiber-optic connector 70 received into the other end of the connector adapter 80. The fitting tip 90 has a tip housing 920 with a front end for inserting into the connector adapter 80, a back end for mounting to a front portion of the inspection microscope, and an internal channel 910 extending from the front end to the back end. The fitting tip 90 further includes a relay lens system 630 disposed inside the internal channel 910. In FIG. 6, the connector adapter 80 receiving the fiber-optic connector 70 on one end and the front end of the fitting tip 90 on the other end is omitted in order to clearly illustrate the imaging geometry of the connector endface 711 by the relay lens 630 of the fitting tip 90 in relation to the microscope objective 130. The overall structure of the fitting tip 90 is also omitted in FIG. 6 since the connection of the fitting tip 90 to the connector adapter 80 and to the front portion of the inspection probe is similar to the arrangement shown in FIG. 2 or FIG. 3B, and is again illustrated in FIG. 8. In FIG. 6, the connector endface 711 is inclined at an angle θ=8°, as an example, from a normal plane to the axis 701 of the connector ferrule 710 of the fiber-optic connector 70. The relay lens 630 of the fitting tip 90 has a magnification of −1×, although the fitting tip of the present invention may be designed to have a different magnification. The angle α between the optical axis 601 of the relay lens 630 and the axis 701 of the connector ferrule 710 is smaller than θ=8°. The object ray 600 along the normal line of the connector endface 711 is refracted by the relay lens 630 and exits from the relay lens 630 as the conjugate image ray 600'. It follows that the image ray 600' intersects with the optical axis 601 of the relay lens at a point of the imaging plane 632 of the endface 711 due to the relay lens 630. (The imaging plane 632 here is theoretically and practically different from the image plane 631 shown in FIG. 4 because the latter is formed when the optical axis of the relay lens is along the normal of the endface.) The essential feature of the fitting tip according to the present application is that the inspection probe 10 is positioned so that the optical axis 101 of the microscope objective 130 is not aligned with the optical axis 601 of the relay lens (as in FIG. 5A or FIG. 5B), but is aligned with the image ray 600'. Therefore, the relay lens 630 not only serves to form an intermediate image of the connector endface 711 on the imaging plane 632 (i.e. the object plane 131 of the inspection probe), but also to deflect the optical axis 101 of the microscope objective 130 to be perpendicular to the connector endface 711. Yet, the optical axis 601 of relay lens 630 doesn't need to be aligned perpendicular to the connector endface 711.

As shown in FIG. 6, the ray 600 is along the normal line of the connector endface 711; in other words, the endface 711 is perpendicular to the ray 600. According to geometrical optics, the image of the endface 711 on the imaging plane 632 is perpendicular to the conjugated ray 600' of the ray 600. Because the optical axis 101 of the microscope objective 130 is aligned with the image ray 600', the imaging plane 632 is also perpendicular to the optical axis 101 of the microscope. Thus, an image of the connector endface 711 with the uniform distinctness can be viewed by the microscope of the inspection probe 10 because all points on the endface 711 can now reach their focus optimum synchronically.

Compared with FIG. 5A & FIG. 5B, the tilting angle of the optical axis 601 of the relay lens 630 in FIG. 6 is now reduced. Therefore the previously-mentioned restriction to the diameter of the relay lens 630 is relaxed, and also the light blocking problem (as shown in FIG. 5A) can be greatly alleviated.

In general terms, the optical axis 601 of the relay lens 630 and the optical axis 101 of the microscope objective 130 form an angle $\gamma_1$; the optical axis 601 of the relay lens 630 and the ray 600 along the normal of the connector endface 711 form an angle $\gamma_2$. It follows that $$\gamma_2 = 8° - \alpha, \beta = \alpha - \gamma_1$$

In FIG. 6, $\gamma_1 = \gamma_2 = \gamma$ because the magnification of the relay lens 630 is −1×. If the angle between the axis 701 of the connector ferrule 710 and the optical axis 101 of the microscope objective 130 is denoted as γ, then it can be easily shown that the angles are related as follows:

$$\gamma = 8° - \alpha, \beta = \alpha - \gamma$$

When γ=4° then α=4°, and β=0°. In that case, the inspection probe is positioned so that the optical axis 101 of the microscope objective 130 is parallel to the axis 701 of the connector ferrule 710, which allows the mechanical body of the fitting tip 90 (shown in FIG. 8) to have the simplest structure for machining. Although FIG. 6 is based on the standard inclined angle $\theta=8°$, the above design concept is applicable to other $\theta$ values, with the best arrangement at $$\alpha=\gamma=\theta/2, \beta=0$$

Figure 7A:
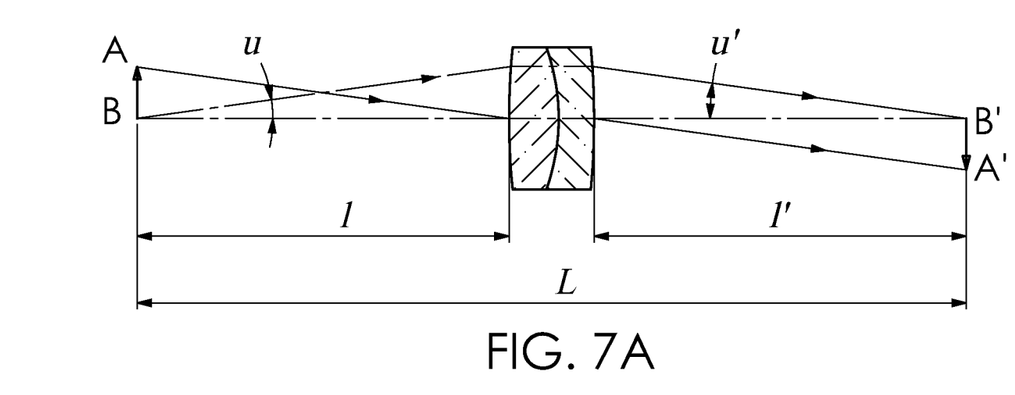
FIG. 7A and FIG. 7B illustrate different relay lens systems that can be used in the present application.
Figure 7B:
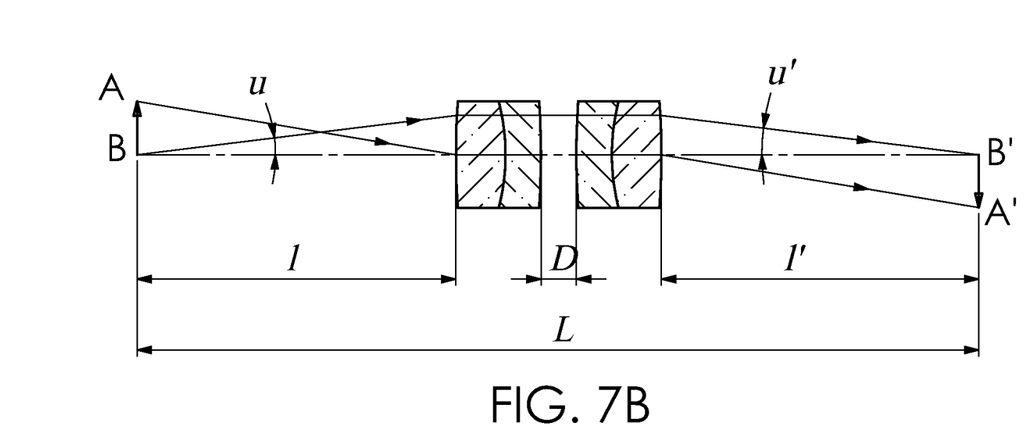

In the foregoing description, the term "relay lens" has been used. However, the relay lens may be a relay lens system consisting of a plurality of lens structure. FIG. 7A and FIG. 7B illustrate two different relay lens systems. The relay lens system in FIG. 7A consists of two lens cemented together. The relay lens system in FIG. 7B consists of two symmetrical groups of lens with each group having two lens cemented together. In comparison, the relay lens system in FIG. 7B can yield a higher-quality image than that in FIG. 7A because of its more complex aberration correction. Moreover, the distance L between the endface 711 and the imaging plane 632 may be changed by varying the spacing between the two groups of the lens while keeping the same magnification. Therefore, it provides an easy way for extending the length of the fitting tip. As one embodiment of the present application, FIG. 8 illustrates a fitting tip 90 for E2000/APC Connector received in a connector adapter 80 and mounted on an inspection probe 10. The optics arrangement in this tip is: $\theta=8°$, $\gamma=\alpha=4°$, with the relay lens structure of FIG. 7B.

The invention is not to be limited to the exact structure and features shown in the accompanying drawings or described in the specification as various changes in the details of construction may be made without departing from the spirit of the invention.

What is claimed is:

1. A fitting tip for an inspection microscope for inspecting an angled fiber-optic connector endface inserted into a fiber-optic connector adapter, the fitting tip comprising:
   a tip housing having a front end for inserting into the connector adapter opposite to the connector endface, a back end for mounting to a front portion of the inspection microscope, and an internal channel extending from the front end to the back end; and
   a relay lens system disposed inside the internal channel of the tip housing,
   wherein, when the front end of the tip housing is inserted into the connector adapter and the back end of the tip housing is mounted to the inspection microscope, the optical axis of the inspection microscope and the optical axis of the relay lens system intersect inside the internal channel of the tip housing and form a predetermined nonzero acute angle $\gamma_1$; the optical axis of the relay lens system is aligned with a point on the connector endface, forming a predetermined nonzero acute angle $\gamma_2$ with a normal line to the connector endface at the said point on the connector endface; the optical axis of the inspection microscope is aligned with a conjugate ray, with respect to the relay lens system, of the ray emitting from the connector endface along the said normal line to the connector endface; and the connector endface is imaged through the relay lens system on an imaging plane within a focusing adjustment range of the inspection microscope.

2. The fitting tip for an inspection microscope as claimed in claim 1, wherein $\gamma_1=\gamma_2=\gamma$.

3. The fitting tip for an inspection microscope as claimed in claim 2, wherein $\gamma=0.5\theta$, wherein $\theta$ is the angle at which the angled connector endface is inclined.

4. The fitting tip for an inspection microscope as claimed in claim 2, wherein $\gamma=4°$.

5. The fitting tip for an inspection microscope as claimed in claim 1, wherein the relay lens system comprises two symmetrical lens subsystems disposed at a distance apart.

6. A fiber-optic endface inspection device for inspecting an angled fiber-optic connector endface inserted into a fiber-optic connector adapter, the fiber-optic endface inspection device comprising:
   an inspection microscope and a fitting tip, the fitting tip comprising:
      a tip housing having a front end for inserting into the connector adapter opposite to the connector endface, a back end for mounting to a front portion of the inspection microscope, and an internal channel extending from the front end to the back end; and
      a relay lens system disposed inside the internal channel of the tip housing,
   wherein, when the front end of the tip housing is inserted into the connector adapter and the back end of the tip housing is mounted to the inspection microscope, the optical axis of the inspection microscope and the optical axis of the relay lens system intersect inside the internal channel of the tip housing and form a predetermined nonzero acute angle $\gamma_1$; the optical axis of the relay lens system is aligned with a point on the connector endface, forming a predetermined nonzero acute angle $\gamma_2$ with a normal line to the connector endface at the said point on the connector endface; the optical axis of the inspection microscope is aligned with a conjugate ray, with respect to the relay lens system, of the ray emitting from the connector endface along the said normal line to the connector endface; and the connector endface is imaged through the relay lens system on an imaging plane within a focusing adjustment range of the inspection microscope.

7. The fiber optic endface inspection device as claimed in claim 6, wherein $\gamma_1=\gamma_2=\gamma$.

8. The fiber optic endface inspection device as claimed in claim 7, wherein $\gamma=0.5\theta$, wherein $\theta$ is the angle at which the angled connector endface is inclined.

9. The fiber optic endface inspection device as claimed in claim 7, wherein $\gamma=4°$.

10. The fiber optic endface inspection device as claimed in claim 6, wherein the relay lens system comprises two symmetrical lens subsystems disposed at a distance apart.

11. A fiber-optic endface inspection device for inspecting an angled fiber-optic connector endface, the fiber-optic endface inspection device comprising:
   an inspection microscope;
   a fiber-optic connector adapter having a first end for receiving and holding the connector endface to be inspected and a second end opposite to the first end; and
   a fitting tip comprising:
      a tip housing having a front end for inserting into the second end of the connector adapter, a back end for mounting to a front portion of the inspection microscope, and an internal channel extending from the front end to the back end; and
      a relay lens system disposed inside the internal channel of the tip housing,
   wherein, when the front end of the tip housing is inserted into the connector adapter and the back end of the tip housing is mounted to the inspection microscope, the optical axis of the inspection microscope and the optical axis of the relay lens system intersect inside the internal channel of the tip housing and form a predetermined nonzero acute angle $\gamma_1$; the optical axis of the relay lens system is aligned with a point on the connector endface, forming a predetermined nonzero acute angle $\gamma_2$ with a normal line to the connector endface at the said point on the connector endface; the optical axis of the inspection microscope is aligned with a conjugate ray, with respect to the relay lens system, of the ray emitting from the connector endface along the said normal line to the connector endface; and the connector endface is imaged through the relay lens system on an imaging plane within a focusing adjustment range of the inspection microscope.

12. The fiber optic endface inspection device as claimed in claim 11, wherein $\gamma_1 = \gamma_2 = \gamma$.

13. The fiber optic endface inspection device as claimed in claim 12, wherein $\gamma = 0.5\theta$, wherein $\theta$ is the angle at which the angled connector endface is inclined.

14. The fiber optic endface inspection device as claimed in claim 12, wherein $\gamma = 4°$.

15. The fiber optic endface inspection device as claimed in claim 11, wherein the relay lens system comprises two symmetrical lens subsystems disposed at a distance apart.

* * * * *